US008090332B2

(12) United States Patent
Sahota et al.

(10) Patent No.: US 8,090,332 B2
(45) Date of Patent: Jan. 3, 2012

(54) TRACKING FILTER FOR A RECEIVER

(75) Inventors: Gurkanwal Singh Sahota, San Diego, CA (US); Chiewcharn Narathong, Laguna Niguel, CA (US); Ravi Sridhara, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 641 days.

(21) Appl. No.: 11/955,118

(22) Filed: Dec. 12, 2007

(65) Prior Publication Data

US 2009/0156152 A1   Jun. 18, 2009

(51) Int. Cl.
*H04B 1/10* (2006.01)
*H04B 1/26* (2006.01)
*H03D 1/00* (2006.01)

(52) U.S. Cl. ........ 455/130; 455/296; 455/307; 455/314; 375/343; 375/350

(58) Field of Classification Search ............... 455/67.11, 455/67.13, 189.1–191.1, 283–286, 296, 306–307, 455/313–314, 323, 333, 339–340; 375/343, 375/346, 350, 326
See application file for complete search history.

(56) References Cited

U.S. PATENT DOCUMENTS

| 3,979,684 | A | 9/1976 | Acker |
| 4,718,113 | A | 1/1988 | Rother et al. |
| 4,862,098 | A | 8/1989 | Yassa et al. |
| 6,714,776 | B1 * | 3/2004 | Birleson ............... 455/302 |
| 7,095,454 | B2 * | 8/2006 | Waight et al. ......... 348/731 |
| 7,336,939 | B2 * | 2/2008 | Gomez ................. 455/307 |
| 7,558,543 | B2 * | 7/2009 | Isaac et al. ........... 455/130 |
| 7,711,329 | B2 * | 5/2010 | Aparin et al. ......... 455/83 |
| 2002/0115420 | A1 * | 8/2002 | Cheng ................. 455/333 |
| 2003/0025841 | A1 * | 2/2003 | Sawyer ............... 348/734 |

(Continued)

FOREIGN PATENT DOCUMENTS

EP   1667347   6/2006

(Continued)

OTHER PUBLICATIONS

Junghwan Han; Gharpurey, R.; "A 2.5MW 900MHZ Receiver Employing Multiband Feedback with Bias Current Reuse", Radio Frequency Integrated Circuits (RFIC) Symposium, 2007 IEEE Digital Object Identifier: 10.1109/RFIC.2007.380894 Publication Year: 2007 , pp. 329-332.

(Continued)

*Primary Examiner* — Simon D Nguyen
(74) *Attorney, Agent, or Firm* — Ramin Mobarhan

(57) ABSTRACT

A tracking filter for attenuating out-of-band signals and adjacent channel signals in a receiver is described. In one exemplary design, an apparatus includes a tracking filter, an LNA, and a downconverter. The tracking filter includes a summer, a filter, and an upconverter. The summer subtracts a feedback signal from an input signal and provides a first signal. The LNA amplifies the first signal and provides a second signal. The downconverter frequency downconverts the second signal and provides an output signal. The filter filters (e.g., differentiates) the output signal and provides a third signal. The filter blocks a desired signal and passes out-of-band signal components. The upconverter frequency upconverts the third signal and provides a fourth signal from which the feedback signal is derived. The tracking filter has an equivalent bandpass filter response and a variable center frequency determined based on the frequency of the desired signal.

23 Claims, 9 Drawing Sheets

U.S. PATENT DOCUMENTS

| | | | |
|---|---|---|---|
| 2004/0219884 A1* | 11/2004 | Mo et al. | 455/67.11 |
| 2006/0154636 A1* | 7/2006 | Shah et al. | 455/290 |
| 2006/0223485 A1* | 10/2006 | Kim et al. | 455/339 |
| 2008/0025437 A1* | 1/2008 | Huynh | 375/324 |
| 2008/0214138 A1* | 9/2008 | Gomez | 455/307 |
| 2008/0242245 A1* | 10/2008 | Aparin | 455/126 |

FOREIGN PATENT DOCUMENTS

| | | |
|---|---|---|
| GB | 2113931 | 8/1983 |
| WO | WO02091578 | 11/2002 |
| WO | WO2005104389 | 11/2005 |

OTHER PUBLICATIONS

Ayazian, S.; Gharpurey, R.; "Feedforward Interference Cancellation in Radio Receiver Front-Ends," Circuits and Systems II: Express Briefs, IEEE Transactions on, vol. 54, Issue: 10 Digital Object Identifier: 10.1109/TCSII.2007.902218; Publication Year: 2007, pp. 902-906.

International Search Report and Written Opinion—PCT/US2008/086488, International Search Authority—European Patent Office—Mar. 3, 2009.

* cited by examiner

US 8,090,332 B2

TRACKING FILTER FOR A RECEIVER

BACKGROUND

I. Field

The present disclosure relates generally to electronics, and more specifically to a filter for a receiver.

II. Background

A wireless communication device (e.g., a cellular phone) may utilize a transceiver to achieve two-way communication with a wireless communication system. The transceiver may include a transmitter for data transmission and a receiver for data reception. For data transmission, the transmitter may modulate a radio frequency (RF) carrier signal with data to obtain a modulated signal. The transmitter may further amplify the modulated signal to obtain an output RF signal and then transmit this signal via a wireless channel to a base station in the wireless system. For data reception, the receiver may receive an RF signal from the base station and may condition and process the received RF signal to obtain data sent by the base station.

The wireless device may be capable of communicating with different wireless systems and/or may support operation on multiple frequency bands. These capabilities may allow the wireless device to receive communication services from more systems and enjoy greater coverage. The wireless device may have multiple receive paths in the receiver for all supported frequency bands and systems. Each receive path may include a set of circuit blocks such as bandpass filter, low noise amplifier (LNA), etc. The circuit blocks for each receive path may be designed specifically for the frequency band(s) and/or system(s) supported by that receiver path. The wireless device may have many receive paths and many circuit blocks in order to support multiple frequency bands and/or multiple systems. These many receive paths may increase the complexity, size, cost and/or power consumption of the wireless device, all of which may be undesirable.

DETAILED DESCRIPTION

The word "exemplary" is used herein to mean "serving as an example, instance, or illustration." Any exemplary embodiment described herein as "exemplary" is not necessarily to be construed as preferred or advantageous over other exemplary embodiments.

The tracking filter described herein may be used for various wireless and wireline communication devices, which may support any number of communication systems and any number of frequency bands. For example, the tracking filter may be used for wireless communication devices for Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, wireless local area networks (WLANs), broadcast systems, satellite positioning systems, etc. A CDMA system may implement a radio technology such as Universal Terrestrial Radio Access (UTRA), cdma2000, etc. UTRA includes Wideband-CDMA (W-CDMA) and other CDMA versions. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). UTRA, E-UTRA, UMTS and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

Figure 1:
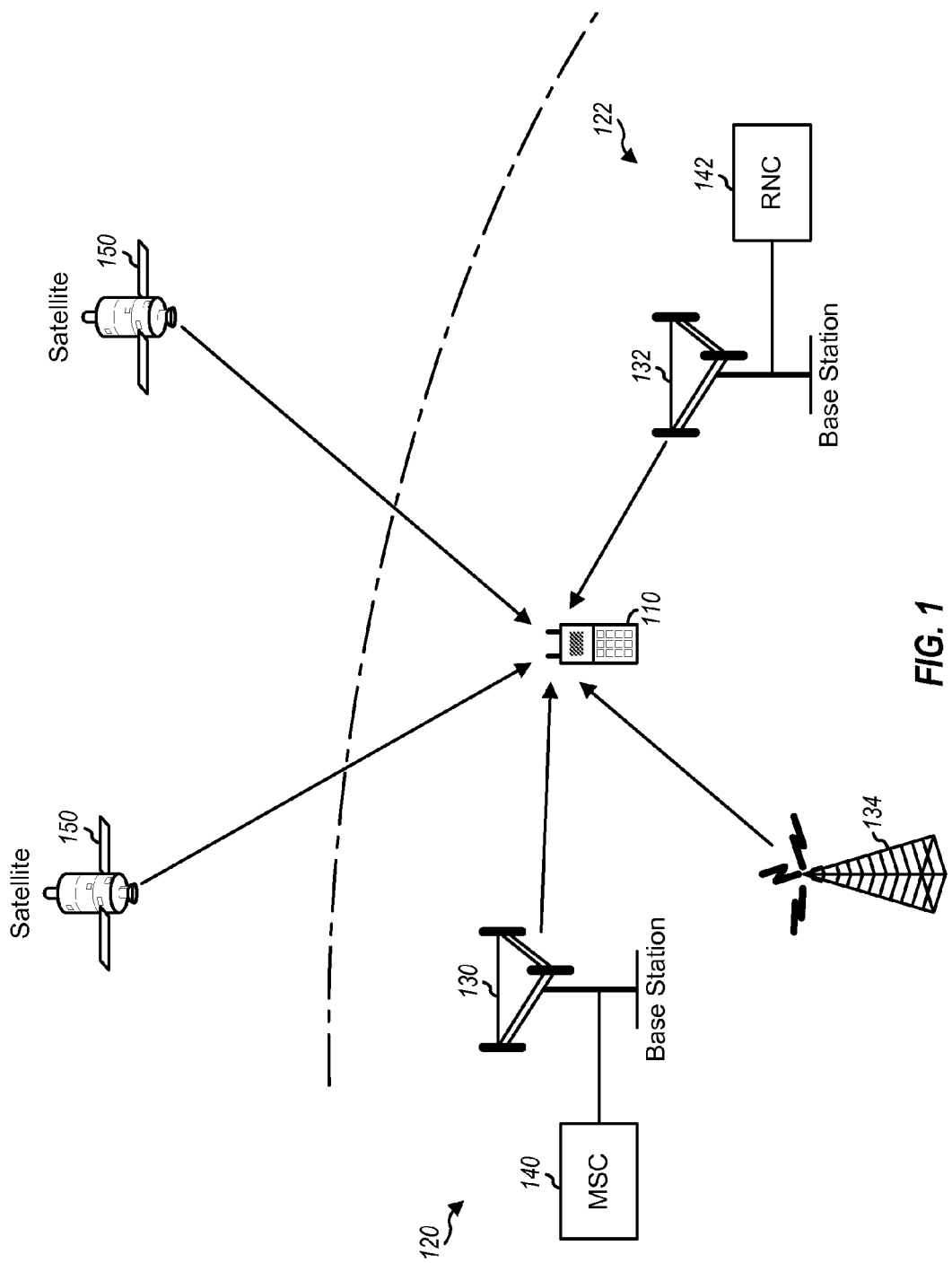
FIG. 1 shows a wireless device communicating with multiple systems.

FIG. 1 shows a wireless communication device 110 capable of communicating with multiple wireless communication systems 120 and 122. Wireless system 120 may be a CDMA system that may implement W-CDMA or cdma2000. Wireless system 122 may be a GSM system. For simplicity, FIG. 1 shows wireless system 120 including one base station 130 and one mobile switching center (MSC) 140, and system 122 including one base station 132 and one radio network controller (RNC). In general, each system may include any number of base stations and any set of network entities. In system 120, base station 130 supports radio communication for wireless devices under its coverage, and MSC 140 provides coordination and control for the base stations coupled to the MSC. In system 122, base station 132 supports radio communication for wireless devices under its coverage, and RNC 142 provides coordination and control for the base stations coupled to the RNC. A base station may also be referred to as a Node B, an evolved Node B (eNB), an access point, etc. MSC 140 and RNC 142 may also be referred to by some other terminology.

Wireless device 110 may be a cellular phone, a personal digital assistant (PDA), a wireless-enabled computer, a wireless modem, a handheld device, a laptop computer, a cordless phone, etc. Wireless device 110 may also be referred to as a user equipment (UE), a mobile station, a terminal, an access terminal, a subscriber unit, a station, etc. Wireless device 110 may be equipped with any number of antennas. In one exemplary design, wireless device 110 includes one external antenna and one internal antenna. Multiple antennas may be used to provide diversity against deleterious path effects such as fading, multipath, interference, etc.

Wireless device 110 may also be capable of receiving signals from broadcast stations. For simplicity, only one broadcast station 134 is shown in FIG. 1. Wireless device 110 may support MediaFLO™, Digital Video Broadcasting for Handhelds (DVB-H), Integrated Services Digital Broadcasting for Terrestrial Television Broadcasting (ISDB-T), and/or other terrestrial broadcast systems.

Wireless device 110 may also be capable of receiving signals from satellites 150. Satellites 150 may belong to a satellite positioning system (SPS) such as the United States Global Positioning System (GPS), the European Galileo system, the Russian GLONASS system, etc. Each GPS satellite transmits a GPS signal encoded with information that allows a GPS receiver on Earth to measure the time of arrival (TOA) of the GPS signal. Measurements for a sufficient number of GPS satellites may be used to obtain an accurate three-dimensional position estimate for the GPS receiver.

In general, wireless device 110 may be capable of communicating with any number of wireless systems via any radio technologies, e.g., W-CDMA, cdma2000, GSM, GPS, etc. For clarity, much of the description below assumes that wireless device 110 is capable of communicating with GSM and CDMA (e.g., W-CDMA and/or cdma2000) systems and receiving GPS signals. Wireless device 110 may also support any number of frequency bands.

Figure 2:
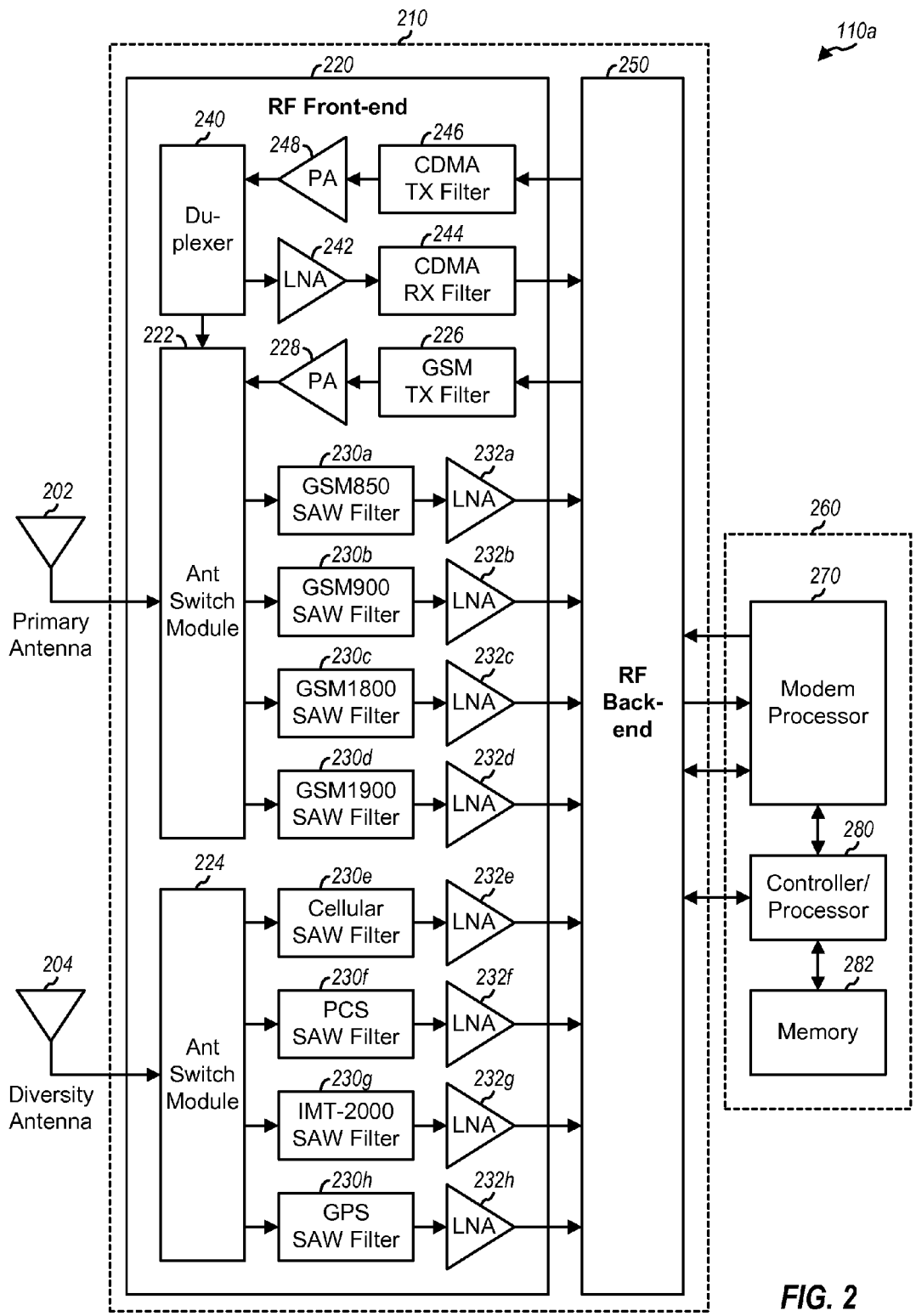
FIG. 2 shows a block diagram of an exemplary design of the wireless device.

FIG. 2 shows a block diagram of a wireless device 110a, which is one exemplary design of wireless device 110 in FIG. 1. Wireless device 110a includes an analog section 210 and a digital section 260. Analog section 210 includes an RF front-end 220 and an RF back-end 250 that collectively support multiple frequency bands for GSM and CDMA and one frequency band for GPS. GSM uses time division duplexing (TDD), and the same frequency channel is used to transmit and receive in different time intervals. CDMA uses frequency division duplexing (FDD), and different frequency channels are used to simultaneously transmit and receive.

Within RF front-end 220, an antenna (Ant) switch module 222 performs switching to allow RF front-end 220 to process either GSM or CDMA. Module 222 further performs switching between transmit and receive when RF front-end 220 is processing GSM. Module 222 has an antenna port coupled to a primary antenna 202 and input ports coupled to a duplexer 240, a power amplifier (PA) 228, and surface acoustic wave (SAW) filters 230a through 230d. Module 222 couples the antenna port to one of the input ports at any given moment.

For GSM, module 222 couples a transmit GSM signal from PA 228 to antenna 202 during transmit periods and couples a received RF signal from antenna 202 to one of SAW filters 230a through 230d during receive periods. Each SAW filter 230 filters its input RF signal for a respective frequency band. SAW filter 230a through 230d provide filtered RF signals to LNAs 232a through 232d, respectively. Each LNA 232 amplifies its filtered RF signal and provides an amplified RF signal to RF back-end 250. For the transmit path, an output GSM signal from RF back-end 250 is filtered by a filter 226 and amplified by PA 228 to obtain the transmit GSM signal, which is coupled by module 222 to antenna 202.

For CDMA, module 222 couples antenna 202 to duplexer 240. Duplexer 240 routes a transmit CDMA signal from a PA 248 to module 222 and further routes the received RF signal from module 222 to an LNA 242. For the receive path, the received RF signal from duplexer 240 is amplified by LNA 242 and filtered by a filter 244 to obtain an input CDMA signal, which is provided to RF back-end 250. For the transmit path, an output CDMA signal from RF back-end 250 is filtered by a filter 246 and amplified by PA 248 to obtain the transmit CDMA signal, which is routed through duplexer 240 and coupled by module 222 to antenna 202. For simplicity, FIG. 2 shows one set of duplexer 240, LNA 242, filters 244 and 246, and PA 248 for one frequency band for CDMA. Multiple sets of these circuit blocks may be used to support multiple frequency bands for CDMA.

An antenna switch module 224 has an antenna port coupled to a diversity/secondary antenna 204 and input ports coupled to SAW filters 230e through 230h. Module 224 couples a received RF signal from antenna 204 to one of SAW filters 230e through 230h at any given moment. Each SAW filter 230 filters its input RF signal for a respective frequency band. SAW filters 230e through 230h provide filtered RF signals to LNAs 232e through 232h, respectively. Each LNA 232 amplifies its filtered RF signal and provides an amplified RF signal to RF back-end 250.

In general, a receiver may include any number of SAW filters for any number of frequency bands and any frequency band. In the exemplary design shown in FIG. 2, SAW filters 230a through 230d support GSM850, GSM900, GSM1800 and GSM1900 bands, respectively. GSM850 and GSM1900 bands are commonly used in the United States, and GSM900 and GSM1800 bands are commonly used in Europe. SAW filters 230e through 230f support cellular, PCS, and IMT-2000 bands, respectively, which are commonly used for CDMA. SAW filter 230g supports GPS band. SAW filters 230a through 230h may also support other frequency bands such as GSM 450, 2600, etc.

RF back-end 250 may include various circuit blocks such as downconverters, variable gain amplifiers (VGAs), amplifiers, buffers, lowpass filters, etc. RF back-end 250 may frequency downconvert the RF signals from LNAs 232a through 232h and filter 244. RF back-end 250 may further amplify and filter the downconverted signals and provide baseband signals to digital section 260. RF back-end 250 may also amplify, filter and frequency upconvert baseband GSM and CDMA signals and provide output GSM and CDMA signals to filters 226 and 246, respectively.

Within digital section 260, a modulator/demodulator (modem) processor 270 may perform modem processing for GSM and CDMA. Modem processor 270 may digitize the baseband signals to obtain samples and may further process (e.g., demodulate and decode) the samples to obtain decoded data. The modem processing for GSM and W-CDMA is described in 3GPP documents, and the modem processing for cdma2000 is described in 3GPP2 documents. 3GPP and 3GPP2 documents are publicly available. A controller/processor 280 may control the operation of modem processor 270 and RF back-end 250. Memory 282 may store data and program codes for modem processor 270 and controller/processor 280.

All or part of RF front-end 220 and RF back-end 250 may be implemented on one or more RFICs, mixed-signal ICs, etc. For example, LNAs 232a through 232h and RF back-end 250 may be implemented on a single RFIC. Modules 222 and 224, duplexer 240, and SAW filters 230a through 230h may be implemented with external discrete components. Modem processor 270, controller/processor 280, and memory 282 may be implemented on one or more application specific integrated circuits (ASICs).

As shown in FIG. 2, wireless device 110a may include many SAW filters to support multiple systems, multiple frequency bands, and/or multiple antennas. The SAW filters may be used to attenuate large amplitude out-of-band signals, which are commonly referred to as jammers or blockers. The jammers may be much larger in amplitude than the desired signals. Hence, the LNAs and subsequent mixers may have high linearity requirements in order to mitigate intermodulation of the jammers with the desired signals. This intermodulation may result in intermodulation distortion products that may fall within the desired signal bandwidth and act as noise that can degrade performance. By attenuating the jammers with SAW filters, the linearity requirements of the LNAs and mixers may be relaxed. However, the SAW filters increase the area and cost of wireless device 110a.

In an aspect, tracking filters may be used to attenuate out-of-band signals and adjacent channel signals prior to the LNAs and may be able to relax linearity requirements of the LNAs and subsequent circuit blocks. The tracking filters may also be referred to as tunable filters, tunable bandpass filters, etc. The tracking filters may support multiple frequency bands and/or multiple systems with the same set of circuit components, which may greatly simplify the design of the receiver. The tracking filters may also be implemented with active circuit components and may be efficiently implemented on an RF integrated circuit (RFIC) to reduce both area and cost.

Figure 3:
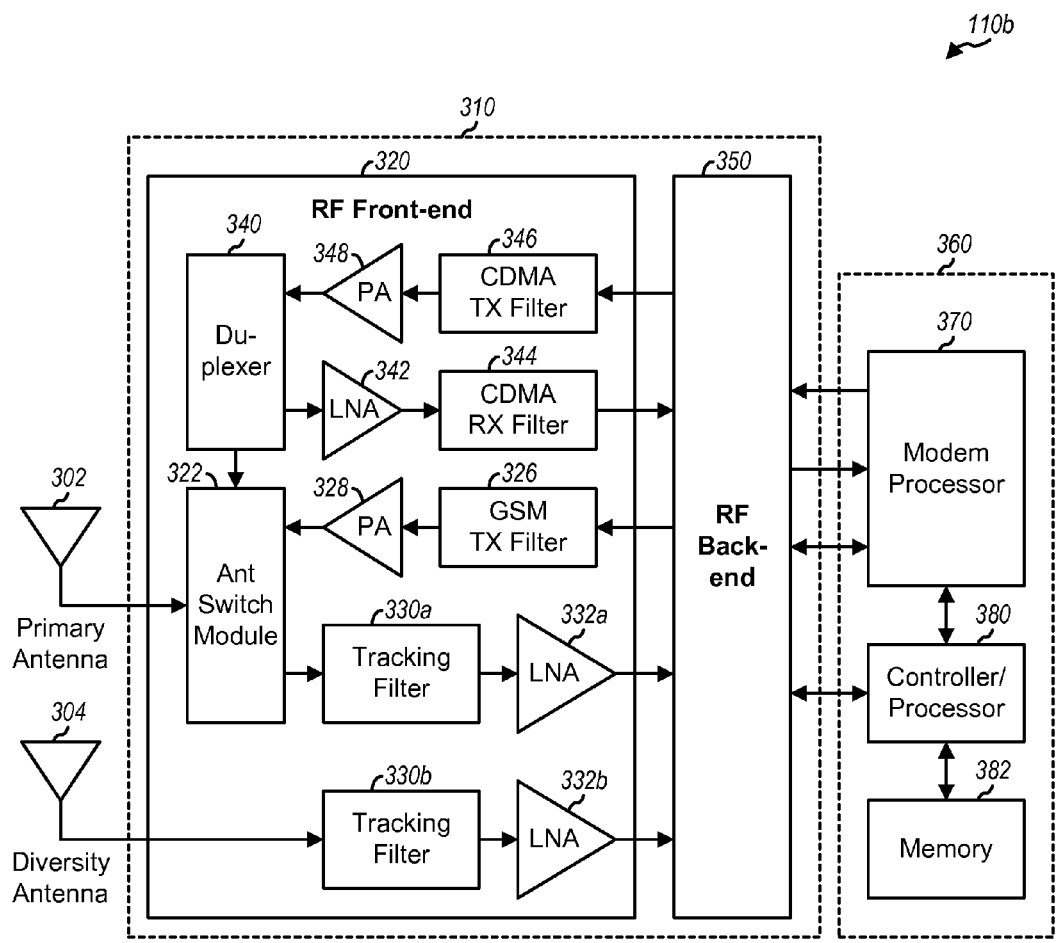
FIG. 3 shows a block diagram of another exemplary design of the wireless device.

FIG. 3 shows a block diagram of a wireless device 110b, which is another exemplary design of wireless device 110 in FIG. 1. Wireless device 110b includes an analog section 310 and a digital section 360. Analog section 310 includes an RF front-end 320 and an RF back-end 350 that collectively support multiple frequency bands for multiple systems, e.g., GSM, CDMA and GPS.

RF front-end 320 includes an antenna switch module 322 that performs switching to allow RF front-end 320 to process either GSM or CDMA. For CDMA, module 322 couples a primary antenna 302 to a duplexer 340. For the receive path, a received RF signal from duplexer 340 is amplified by an LNA 342 and filtered by a filter 344 to obtain an input CDMA signal, which is provided to RF back-end 350. For the transmit path, an output CDMA signal from RF back-end 350 is filtered by a filter 346 and amplified by a PA 348 to obtain a transmit CDMA signal, which is routed through duplexer 340 and coupled by module 322 to antenna 302. In general, RF front-end 320 may include any number of sets of duplexer 340, LNA 342, filters 344 and 346, and PA 348 for any number of frequency bands for CDMA.

For GSM, module 322 couples a transmit GSM signal from PA 328 to antenna 302 during transmit periods and couples a first received RF signal from antenna 302 to a tracking filter 330a during receive periods. Tracking filter 330a filters the first received RF signal based on a frequency response that tracks or follows the center frequency of a desired signal and provides a first filtered RF signal. An LNA 332a amplifies the first filtered RF signal and provides a first amplified RF signal to RF back-end 350. Similarly, a tracking filter 330b receives a second received RF signal from a diversity/secondary antenna 304, filters the second received RF signal based on a frequency response that tracks the center frequency of a desired signal, and provides a second filtered RF signal. An LNA 332b amplifies the second filtered RF signal and provides a second amplified RF signal to RF back-end 350.

Tracking filters 330a and 330b may be operated independently. Tracking filter 330a and/or 330b may be active at any given moment. Tracking filters 330a and 330b may receive RF signals on the same or different frequency bands and from the same or different systems. Tracking filters 330a and 330b may also have the same or different designs. For example, tracking filters 330a and 330b may have the same or different bandwidths, the same or different filter orders and frequency responses, etc. Several exemplary designs of tracking filters 330a and 330b are described below.

RF back-end 350 may include various circuit blocks such as mixers, VGAs, amplifiers, buffers, lowpass filters, etc. RF back-end 350 may frequency downconvert the RF signals from LNAs 332a, 332b and filter 344, amplify and filter the downconverted signals, and provide baseband signals to digital section 360.

Within digital section 360, a modem processor 370 may digitize the baseband signals to obtain samples and may further process the samples to obtain decoded data. A controller/processor 380 may control the operation of modem processor 370 and RF back-end 350. Memory 382 may store data and program codes for modem processor 370 and controller/processor 380.

All or part of RF front-end 320 and RF back-end 350 may be implemented on one or more RFICs, mixed-signal ICs, etc. For example, tracking filters 330a and 330b, LNAs 332a and 332b, and RF back-end 350 may be implemented on a single RFIC. Modem processor 370, controller/processor 380 and memory 382 may be implemented on one or more ASICs.

As shown in FIGS. 2 and 3, the receiver within wireless device 110 may be simplified with the use of tracking filters 330 in place of SAW filters 230. For the exemplary designs shown in FIGS. 2 and 3, the use of tracking filters 330 may allow for removal of eight SAW filters, six LNAs, one antenna switch module, and possibly IC pins and pads. The use of tracking filters 330 may thus greatly reduce the area and cost of the receiver.

In general, a receiver may be implemented with a super-heterodyne architecture or a direct-conversion architecture. In the super-heterodyne architecture, a signal is frequency downconverted from RF to baseband in multiple stages, e.g., from RF to an intermediate frequency (IF) in one stage, and then from IF to baseband in another stage. In the direct-conversion architecture, which is also referred to as a zero-IF (ZIF) architecture, a signal is frequency downconverted from RF directly to baseband in one stage. The super-heterodyne and direct-conversion architectures may use different circuit blocks and/or have different requirements. The tracking filters may be used for both the super-heterodyne architecture and the direct-conversion architecture. For clarity, the use of the tracking filter for the direct-conversion architecture is described below.

Figure 4:
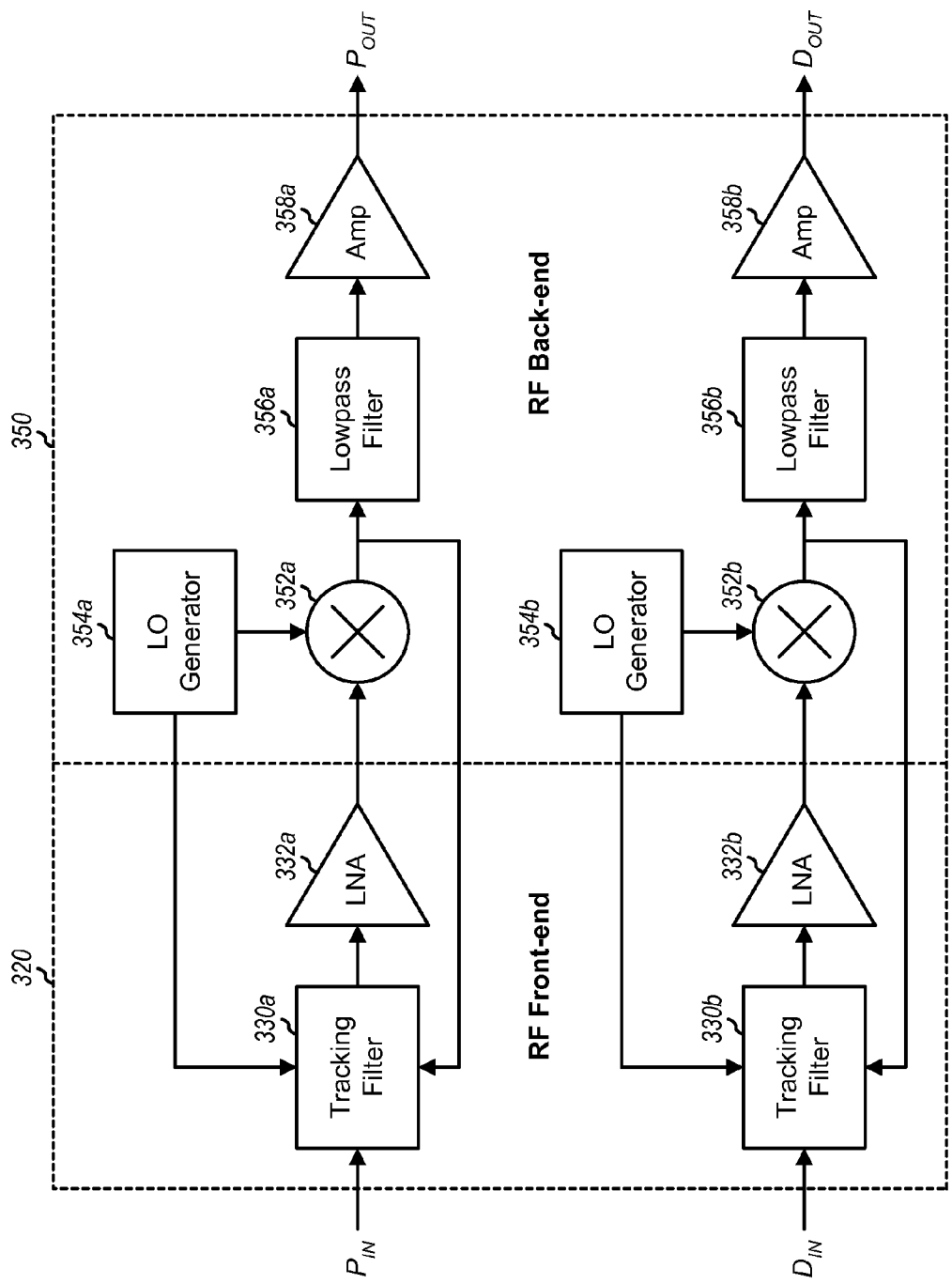
FIG. 4 shows a block diagram of an RF back-end.

FIG. 4 shows a block diagram of an exemplary design of a portion of RF back-end 350, which implements the direct-conversion architecture. Within RF back-end 350, a downconverter 352a receives and frequency downconverts the first amplified RF signal from LNA 332a with a first local oscillator (LO) signal from an LO generator 354a and provides a first downconverted signal. A lowpass filter 356a filters the first downconverted signal and provides a first filtered signal. An amplifier (Amp) 358a amplifies the first filtered signal and provides a first baseband signal $P_{OUT}$. Similarly, a mixer 352b receives and frequency downconverts the second amplified RF signal from LNA 332b with a second LO signal from an LO generator 354b and provides a second downconverted signal. A lowpass filter 356b filters the second downconverted signal and provides a second filtered signal. An amplifier 358b amplifies the second filtered signal and provides a second baseband signal $D_{OUT}$.

FIG. 4 shows a specific RF back-end design. In general, the conditioning of the signals in a receiver may be performed by one or more stages of amplifier, filter, mixer, etc. These circuit blocks may be arranged differently from the configuration shown in FIG. 4. Furthermore, other circuit blocks not shown in FIG. 4 (e.g., VGAs) may also be used to condition the signals in the receiver. Some circuit blocks in FIG. 4 may also be omitted.

Figure 5:
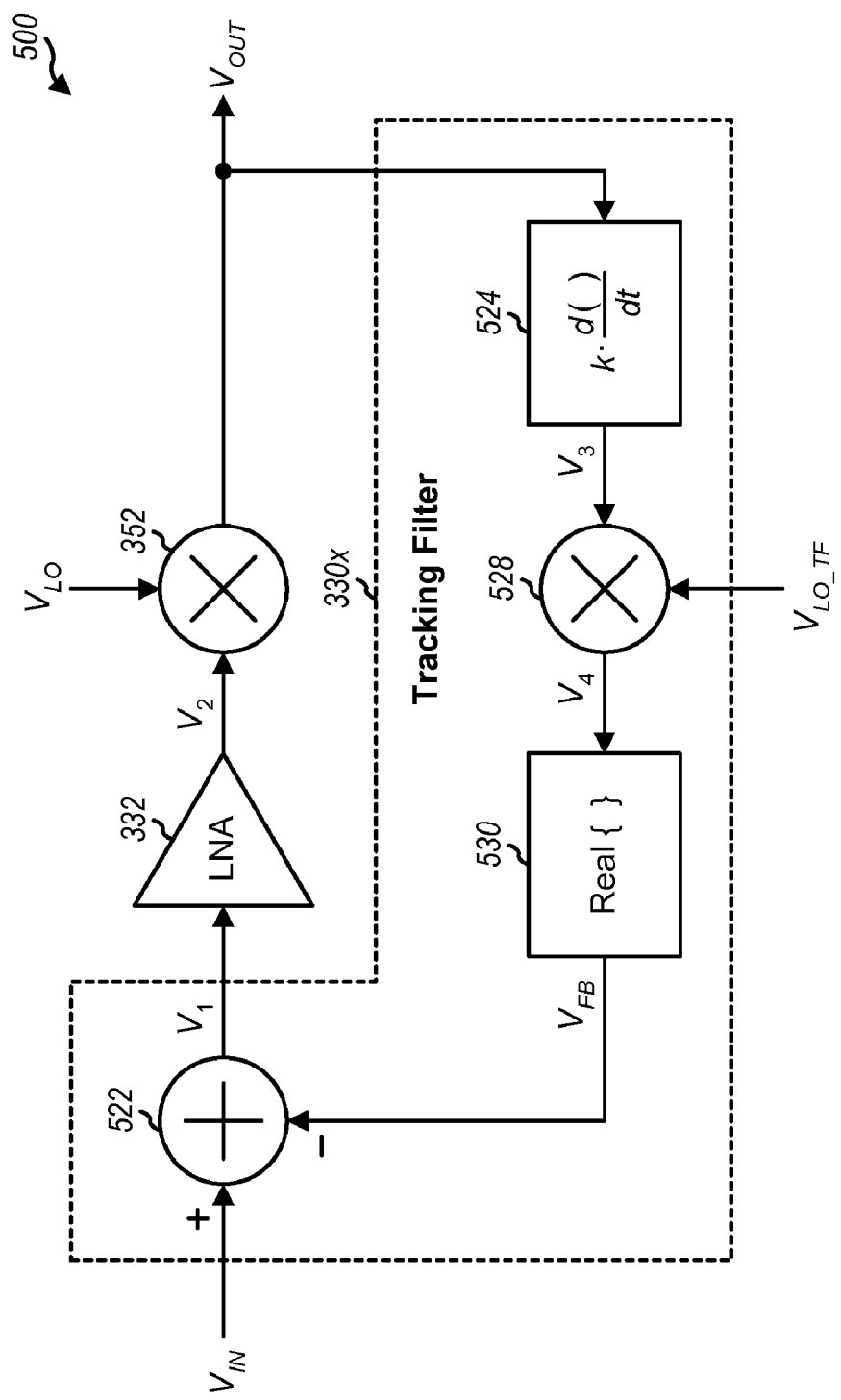
FIG. 5 shows a block diagram of a receive path with a tracking filter.

FIG. 5 shows a block diagram of an exemplary design of a receive path 500 with a tracking filter 330x. Receive path 500 may be used for the primary or diversity antenna. Tracking filter 330x may be used for each of tracking filters 330a and 330b in FIGS. 3 and 4. In the exemplary design shown in FIG. 5, a summer 522 within tracking filter 330x receives an input signal $V_{IN}$ for the tracking filter and a feedback signal $V_{FB}$, subtracts the feedback signal from the input signal, and provides a first signal $V_1$. The input signal $V_{IN}$ may correspond to the first received RF signal from primary antenna 302 or the second received RF signal from diversity antenna 304 in FIG. 3. LNA 332 amplifies the first signal $V_1$ and provides a second signal $V_2$. Downconverter 352 frequency downconverts the second signal $V_2$ with an LO signal $V_{LO}$ and provides an output signal $V_{OUT}$, which may be at baseband or an IF frequency.

Within tracking filter 330x, a differentiator 524 receives and differentiates the output signal $V_{OUT}$ and provides a third signal $V_3$. An upconverter 528 frequency upconverts the third signal $V_3$ with an LO signal $V_{LO\_TF}$ and provides a fourth signal $V_4$. The LO signals $V_{LO}$ and $V_{LO\_TF}$ may have the same frequency. A unit 530 receives the fourth signal from upconverter 528 and provides the real part of the fourth signal as the feedback signal $V_{FB}$ to summer 522.

Tracking filter 330x operates as follows. The input signal $V_{IN}$ is amplified by LNA 332 and frequency downconverted by downconverter 352 to obtain the output signal $V_{OUT}$. Differentiator 524 acts as a highpass filter that blocks the desired signal and passes higher frequency components. The higher frequency components are upconverted by upconverter 528 and subtracted from the input signal by summer 522. The amount of out-of-band rejection by tracking filter 330x may thus be determined by the frequency response of differentiator 524.

For a first-order differentiator 524, as shown in FIG. 5, the output signal from tracking filter 330x after frequency downconversion may be expressed as:

$$V_{OUT}(f - f_{LO}) = V_{IN}(f) \cdot \frac{G}{1 + j2\pi fGk}, \quad \text{Eq (1)}$$

where G is the gain of LNA 332, k is the gain of differentiator 524, $f_{LO}$ is the frequency of the LO signal used for downconversion, $V_{IN}(f)$ is the input signal as a function of frequency f at RF, and $V_{OUT}(f-f_{LO})$ is the output signal as a function of frequency $f-f_{LO}$ after downconversion.

Equation (1) indicates that the output signal may be obtained by downconverting the input signal and applying a lowpass filter. The transfer function H(f) of the lowpass filter may be expressed as:

$$H(f) = \frac{V_{OUT}(f - f_{LO})}{V_{IN}(f)} = \frac{1/k}{1/Gk + j2\pi f}. \quad \text{Eq (2)}$$

Equation (2) indicates that the lowpass filter response has a bandwidth of $BW_{LPF}=1/Gk$ and a direct current (DC) gain of 1/k. Furthermore, the lowpass filter is applied after the downconversion, and the lowpass filter bandwidth may be set based on the desired signal bandwidth. For example, the lowpass filter bandwidth may be set to hundreds of KHz for GSM or several MHz for CDMA. The transfer function of the lowpass filter is effectively upconverted to RF by upconverter 528 and results in the input signal $V_{IN}$ observing an equivalent bandpass filter. The bandwidth and response of the equivalent bandpass filter is determined by the bandwidth and response of the lowpass filter. The quality factor Q of the equivalent bandpass filter may be expressed as:

$$Q = \frac{f_{LO}}{BW_{LPF}}. \quad \text{Eq (3)}$$

The lowpass filter bandwidth $BW_{LPF}$ may be set based on the desired signal bandwidth, which may be hundreds of KHz or several MHz. The LO frequency $f_{LO}$ is determined by the center frequency of the desired signal and may be hundreds of MHz or several GHz. Hence, very high Q may be achieved for the equivalent bandpass filter. Furthermore, the high Q may be achieved using active circuit components (e.g., transistors), without the need for high Q reactive components (e.g., inductors).

In the exemplary design shown in FIG. 5, the feedback signal $V_{FB}$ is subtracted from the input signal $V_{IN}$ prior to LNA 332. The first signal $V_1$ from summer 522 may have lower out-of-band signal levels, which may relax the linearity requirements of LNA 332 and downconverter 352. The feedback signal may also be applied at other locations prior to downconverter 352.

Figure 6:
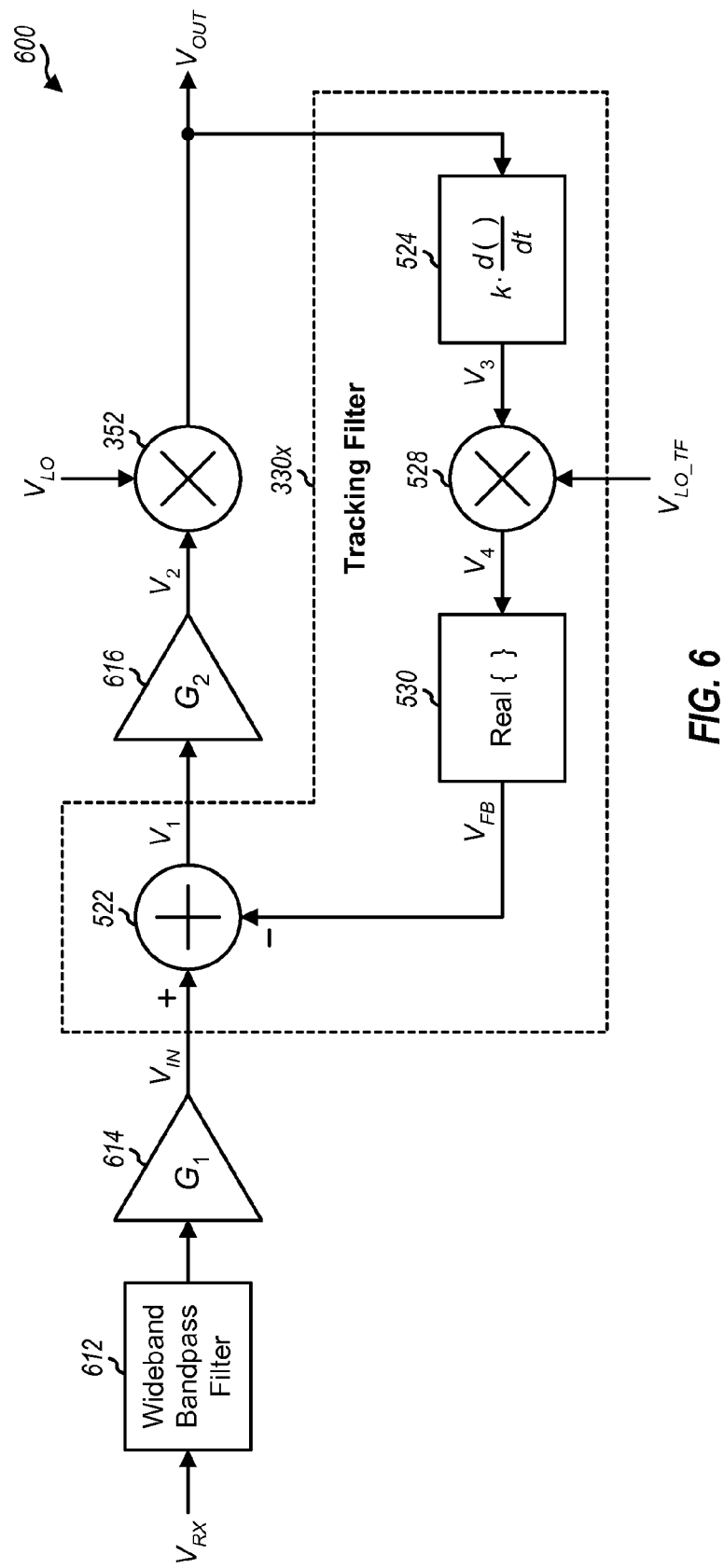
FIG. 6 shows a block diagram of another receive path with the tracking filter.

FIG. 6 shows a block diagram of an exemplary design of a receive path 600 with tracking filter 330x. Receive path 600 may be used for the primary or diversity antenna. In the exemplary design shown in FIG. 6, a wideband bandpass filter 612 receives and filters a received signal $V_{RX}$ and provides a filtered signal. The received signal $V_{RX}$ may correspond to the first received RF signal from primary antenna 302 or the second received RF signal from diversity antenna 304 in FIG. 3. Filter 612 may provide broadband frequency selectivity, and the bandwidth of filter 612 may be tens or hundreds of MHz. Filter 612 may also provide impedance matching. LNA 332 in FIG. 5 may be implemented with amplifiers 614 and 616. Amplifier 614 amplifies the filtered signal from filter 612 with a gain of $G_1$ and provides an input signal $V_{IN}$ for tracking filter 330x. Summer 522 subtracts a feedback signal $V_{FB}$ from the input signal $V_{IN}$ and provides a first signal $V_1$. Amplifier 616 amplifies the first signal $V_1$ with a gain of $G_2$ and provides a second signal $V_2$ to downconverter 352.

LNA 332 in FIG. 5 may have a gain of G, which may be split between the gains $G_1$ and $G_2$ of amplifiers 614 and 616, respectively. Amplifier 614 may provide a small gain and may be designed to handle possible large out-of-band signal components. Amplifier 616 may provide the remaining gain and may be designed with relaxed linearity requirements. Summer 522 may be more easily implemented after amplifier 614. For example, an output current $I_{FB}$ from unit 530 may be subtracted from an output current $I_{IN}$ from amplifier 614 by inverting $I_{FB}$ and summing the inverted $I_{FB}$ and $I_{IN}$ at a summing node.

Figure 7:
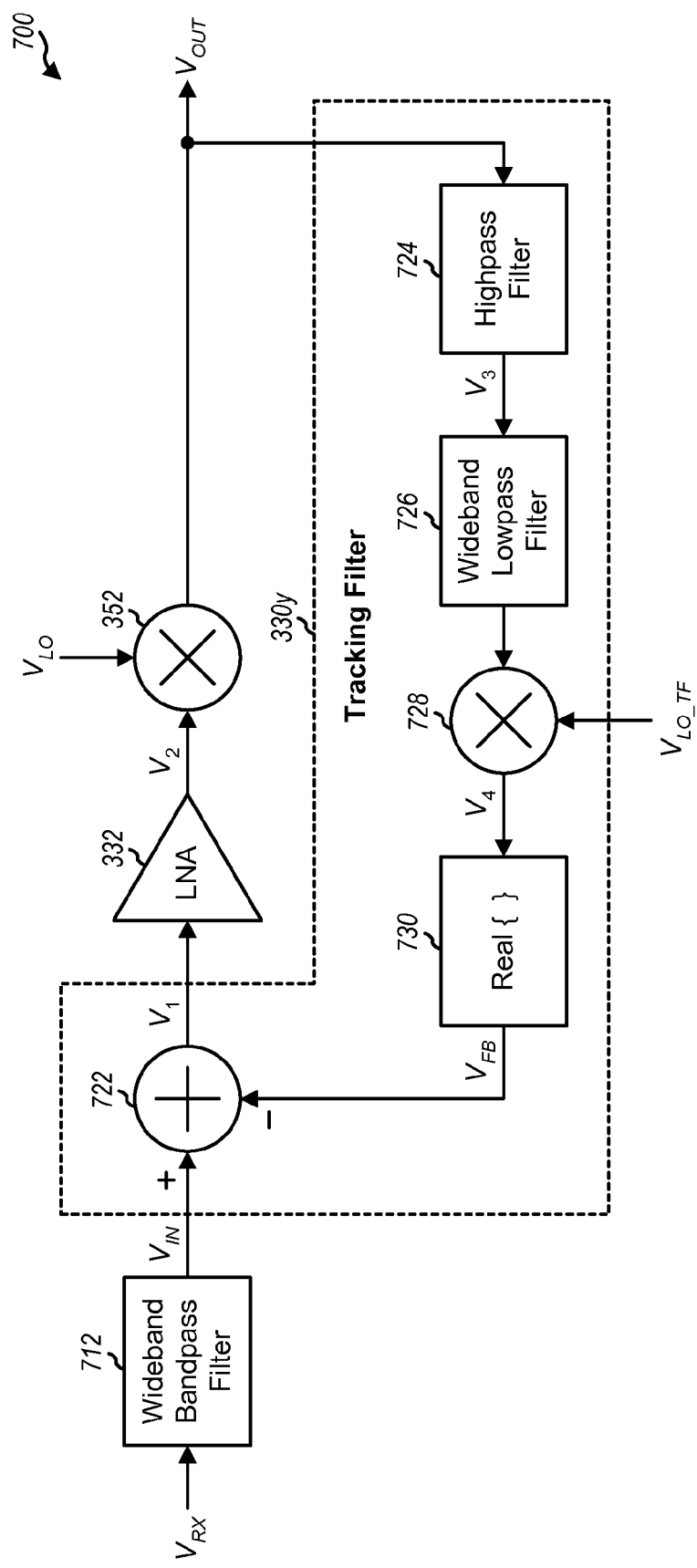
FIG. 7 shows a block diagram of a receive path with another tracking filter.

FIG. 7 shows a block diagram of an exemplary design of a receive path 700 with a tracking filter 330y. Receive path 700 may be used for the primary or diversity antenna. Tracking filter 330y may be used for each of tracking filters 330a and 330b in FIGS. 3 and 4. In receive path 700, a wideband bandpass filter 712 receives and filters a received signal $V_{RX}$ and provides an input signal $V_{IN}$ for tracking filter 330y.

In the exemplary design shown in FIG. 7, tracking filter 330y includes a summer 722, an upconverter 728, and a real unit 730 that are coupled in similar manner as summer 522, upconverter 528, and real unit 530, respectively, in tracking filter 330x in FIG. 5. Tracking filter 330y further includes a highpass filter 724 and a wideband lowpass filter 726. Highpass filter 724 receives and filters an output signal $V_{OUT}$ from downconverter 352 and provides a third signal $V_3$. Highpass filter 724 may block a desired signal and pass out-of-band signal components. Highpass filter 724 may have any suitable bandwidth and filter order, e.g., first, second, third, or higher order. Higher order may be achieved with higher order derivatives, as described below. Lowpass filter 726 receives and filters the third signal $V_3$ and provides a filtered third signal to upconverter 728. Lowpass filter 726 may have a wide bandwidth and may suppress $f_{LO}+f_{RF}$ components as well as harmonics of LO signals. These LO components may be relatively large in comparison to the feedback signal. Hence, suppressing these LO components may improve the attenuation of out-of-band signal components in the input signal.

FIGS. 5, 6 and 7 show some exemplary tracking filter designs and some exemplary receiver path designs that incorporate a tracking filter. A tracking filter and/or a receive path may include other circuit blocks that may improve performance. For example, a DC offset removal block may be inserted prior to after differentiator 524 in FIG. 5, after highpass filter 724 in FIG. 7, prior to upconverter 528 or 728, etc. The DC offset removal block may estimate and remove DC offset, which may improve performance.

Figure 8:
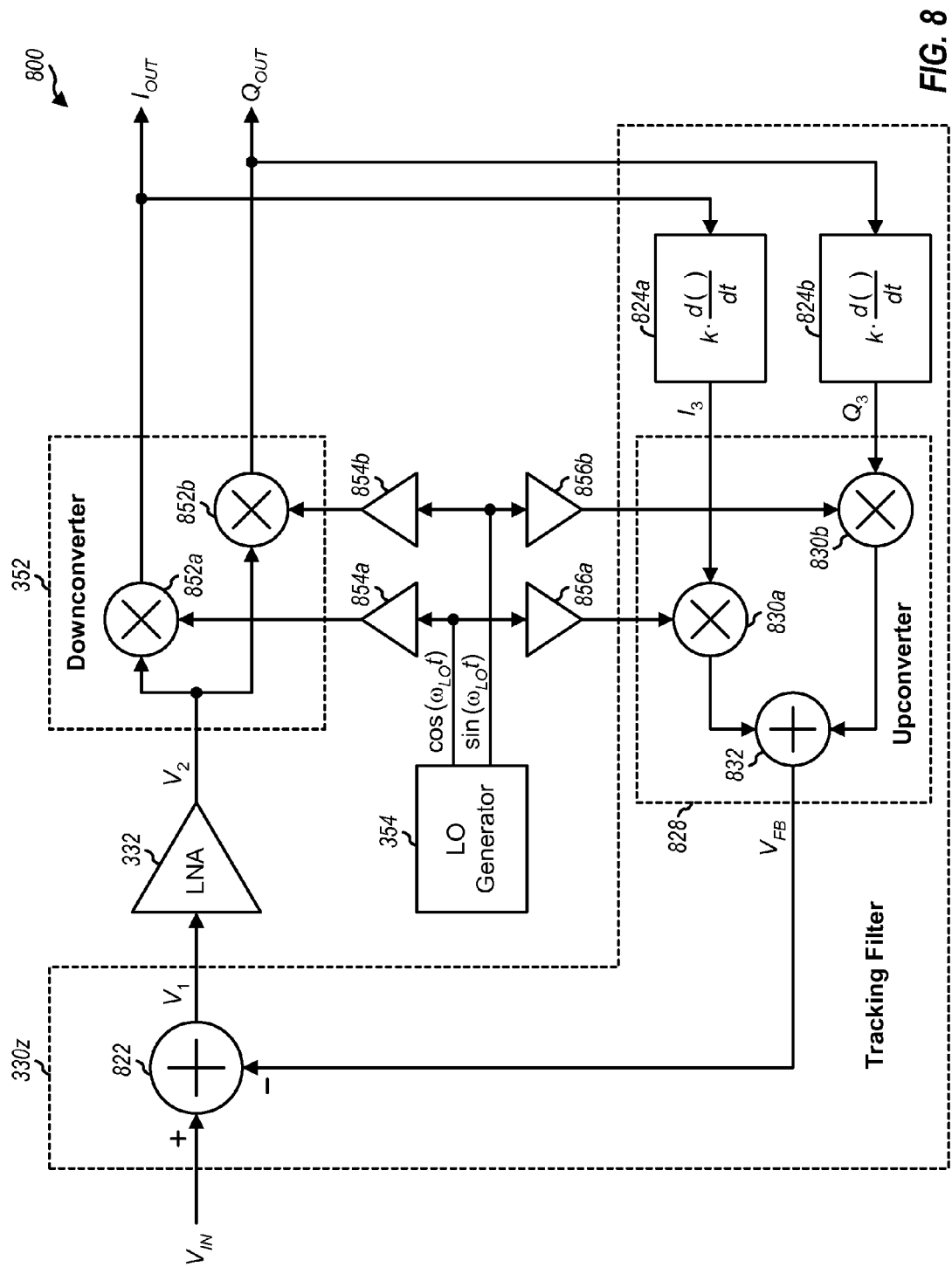
FIG. 8 shows a block diagram of a receive path with yet another tracking filter.

FIG. 8 shows a block diagram of an exemplary design of a receive path 800 with a tracking filter 330z. Receive path 800 may be used for the primary or diversity antenna. Tracking filter 330z may also be used for each of tracking filters 330a and 330b in FIGS. 3 and 4. Within tracking filter 330z, a summer 822 subtracts a feedback signal $V_{FB}$ from an input signal $V_{IN}$ for the tracking filter and provides a first signal $V_1$. LNA 332 amplifies the first signal $V_1$ and provides a second signal $V_2$ to downconverter 352. Within downconverter 352, a mixer 852a downconverts the second signal $V_2$ with a cosine signal cos ($\omega_{LO}$ t) and provides an inphase output signal $I_{OUT}$. A mixer 852b downconverts the second signal $V_2$ with a sine signal sin ($\omega_{LO}$ t) and provides a quadrature output signal $Q_{OUT}$.

Within tracking filter 330z, differentiators 824a and 824b differentiate the $I_{OUT}$ and $Q_{OUT}$ signals and provide $I_3$ and $Q_3$ signals, respectively. Within an upconverter 828, a mixer 830a upconverts the $I_3$ signal with a cosine signal cos ($\omega_{LO}$ t), and a mixer 830b upconverts the $Q_3$ signal with a sine signal sin ($\omega_{LO}$ t). A summer 832 sums the outputs of mixers 830a and 830b and provides a feedback signal $V_{FB}$ to summer 822. Upconverter 828 multiplies a complex third signal composed of $I_3$ and $Q_3$ with a complex LO signal composed of cos ($\omega_{LO}$ t) and sin ($\omega_{LO}$ t) and provides the real part of the resultant product.

LO generator 354 generates the cosine and sine signals at a desired LO frequency of $\omega_{LO}=2\pi f_{LO}$. Buffers 854a and 854b buffer the cosine and sine signals from LO generator 354 and provide buffered cosine and sine signals to mixers 852a and 852b, respectively. Buffers 856a and 856b buffer the cosine and sine signals from LO generator 354 and provide buffered cosine and sine signals to mixers 830a and 830b, respectively. The complex LO signal used for downconversion thus has the same frequency as the complex LO signal used for upconversion.

Mixers 830a, 830b, 852a and 852b may be implemented with various designs known in the art, e.g., with Gilbert multipliers. To reduce 1/f noise, mixers 830a and 830b may be implemented with passive mixers, e.g., switch field effect transistors (FETs).

A tracking filter may be designed to ensure stable operation. This may be achieved by ensuring sufficient closed-loop phase margin for the highest operating frequency. Delay units may be inserted at appropriate locations within the tracking filter, as needed, to ensure stable operation. For example, delay units may be inserted before or after buffers 856a and 856b to adjust the delay or phase of the cosine and sine signals provided to mixers 830a and 830b.

Figure 9:
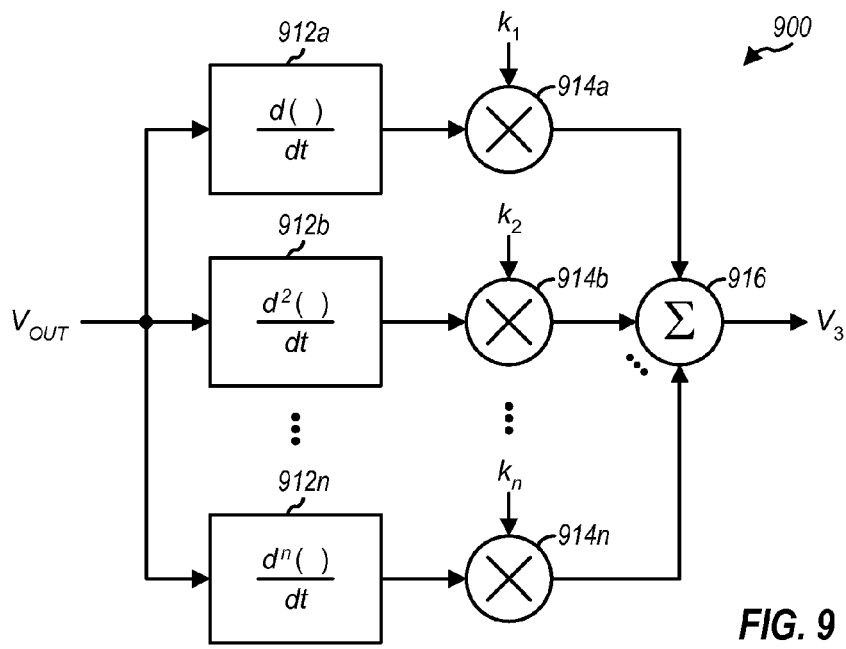
FIG. 9 shows a block diagram of a differentiator.

FIG. 9 shows a block diagram of an exemplary design of a differentiator 900, which may be used for differentiator 524 in FIG. 5, highpass filter 724 in FIG. 7, and each of differentiators 824a and 824b in FIG. 8. Within differentiator 900, an output signal $V_{OUT}$ from a downconverter is provided to differentiators 912a through 912n. Differentiator 912a is a first-order differentiator, differentiator 912b is a second-order differentiator, and so no, and differentiator 912n is an n-th order differentiator, where n may be any integer value one or greater. The outputs of differentiators 912a through 912n are scaled by multipliers 914a through 914n with scaling factors of $k_1$ through $k_n$, respectively. A summer 916 sums the outputs of multipliers 914a through 914n and provide a third signal $V_3$. In general, differentiator 900 may implement any number of differentiators of any order.

Figure 10:
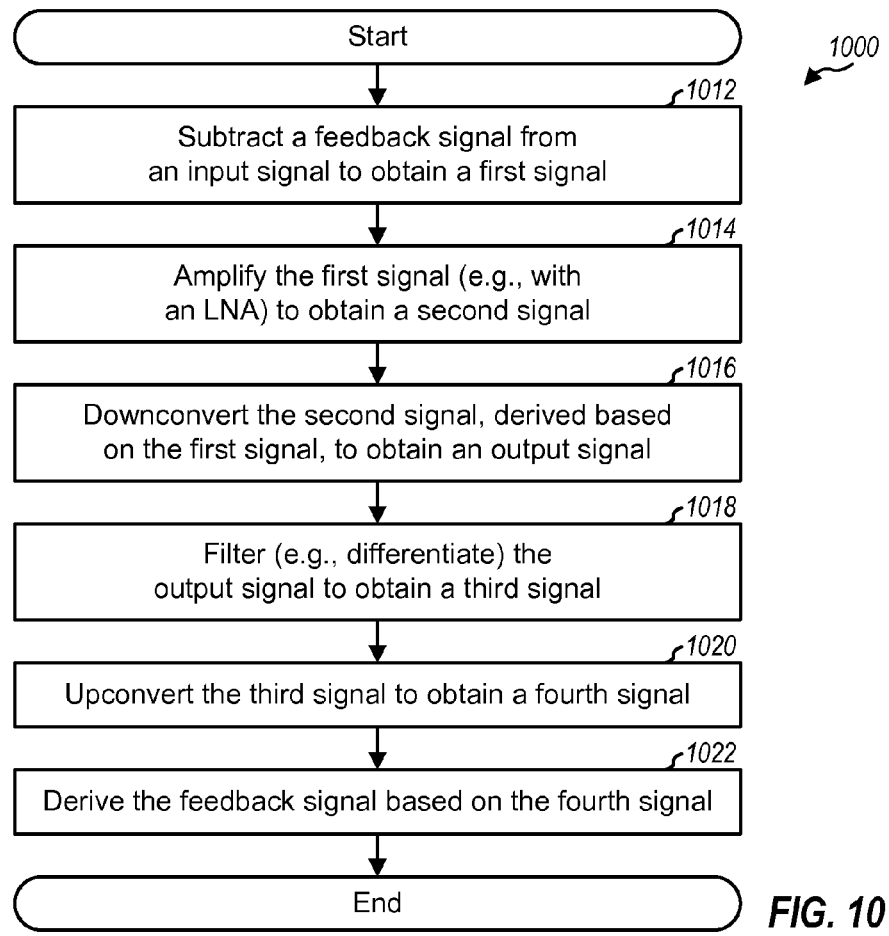
FIG. 10 shows processing of a received signal with a tracking filter.

FIG. 10 shows an exemplary design of a process 1000 for processing a signal with a tracking filter. A feedback signal may be subtracted from an input signal to obtain a first signal (block 1012). The first signal may be amplified (e.g., with an LNA) to obtain a second signal (block 1014). The second signal may be downconverted to obtain an output signal (block 1016). The output signal may be filtered (e.g., differentiated) to obtain a third signal (block 1018). The third signal may be upconverted to obtain a fourth signal (block 1020). The second signal may be downconverted based on a first LO signal, and the third signal may be upconverted based on a second LO signal having the same frequency as the first LO signal. The feedback signal may be derived based on the fourth signal (block 1022).

For block 1018, the filtering may be achieved by differentiating the output signal, highpass filtering the output signal, etc. The filtering in block 1018 may block a desired signal being received and pass out-of-band signal components. The third signal may also be lowpass filtered to remove spurious components due to the LO signals used for downconversion and upconversion.

The input signal may be from an antenna, e.g., as shown in FIGS. 5 and 7. The input signal may also be obtained by amplifying and/or bandpass filtering a received signal from an antenna, e.g., as shown in FIGS. 6 and 8. The tracking filter may be used to filter the input signal for multiple frequency bands in GSM and/or other systems. The tracking filter may also filter a signal from a primary antenna or a diversity antenna.

In general, an apparatus may include a tracking filter, an LNA, and a downconverter. The tracking filter may include a summer, a filter, and an upconverter. The summer may subtract a feedback signal from an input signal and provide a first signal. The LNA may amplify the first signal and provide the second signal. The downconverter may frequency downconvert the second signal and provide an output signal. The filter may filter (e.g., differentiate) the output signal and provide a third signal. The filter may block a desired signal being received and pass out-of-band signal components. The upconverter may frequency upconvert the third signal and provide a fourth signal from which the feedback signal is derived. The frequency downconversion may be based on a first LO signal, and the frequency upconversion may be based on a second LO signal having the same frequency as the first LO signal. The tracking filter may have an equivalent bandpass filter response and a variable center frequency that may be determined based on the frequency of the desired signal.

The tracking filter described herein may be used for various systems, which may have different performance requirements. For GSM, a receiver should be able to handle out-ofband blockers with power levels of 0 dBm while receiving a desired signal at approximately −112 dBm. The tracking filter may be able to sufficiently attenuate the blockers prior to an LNA, which may then relax the linearity requirements of the LNA and subsequent circuits and allow these circuit blocks to be operated with less power.

For CDMA primary antenna, the receiver should be able to sufficiently attenuate a transmit RF signal generated by a transmitter within the wireless device. Referring back to FIG. 3, the transmit CDMA signal from PA 348 is routed through duplexer 340 and module 322 to primary antenna 302 and may be as high as +23 dBm at the primary antenna. Module 322 also routes a received RF signal from primary antenna 302 to tracking filter 330a. The transmit CDMA signal may leak through module 322 from the TX input to the RX input. Tracking filter 330a may be able to sufficiently attenuate the transmit CDMA signal leakage, which may then relax the linearity requirements of LNA 332a and subsequent circuits.

For CDMA secondary antenna and GPS, the receiver should be able to sufficiently attenuate a transmit RF signal generated by the transmitter. The isolation between the primary and secondary antennas may be 10 to 15 dB, and the receiver should be able to handle a transmit RF signal component of −5 to 0 dBm at the secondary antenna. Tracking filter 330b may be able to sufficiently attenuate the transmit RF signal component, which may then relax the linearity requirements of LNA 332b and subsequent circuits.

The tracking filter described herein may be implemented on an IC, an RFIC, a mixed-signal IC, an ASIC, a printed circuit board (PCB), an electronics device, etc. The tracking filter may also be fabricated with various IC process technologies such as complementary metal oxide semiconductor (CMOS), N-channel MOS (N-MOS), P-channel MOS (P-MOS), bipolar junction transistor (BJT), bipolar-CMOS (BiCMOS), silicon germanium (SiGe), gallium arsenide (GaAs), etc.

An apparatus implementing the tracking filter described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for communication, comprising:
    a summer to receive an input signal and a feedback signal and provide a first signal;
    a downconverter to frequency downconvert a second signal derived based on the first signal and provide an output signal at the output of a receive path of the apparatus;
    a filter to filter the output signal and provide a third signal; and
    an upconverter to frequency upconvert the third signal and provide a fourth signal from which the feedback signal is derived, where the summer, the filter and the upconverter form a tracking filter.

2. The apparatus of claim 1, further comprising a low noise amplifier (LNA) to amplify the first signal and provide the second signal.

3. The apparatus of claim 1, further comprising:
    a first amplifier to amplify a received signal and provide the input signal; and
    a second amplifier to amplify the first signal and provide the second signal.

4. The apparatus of claim 3, where the summer comprises a summing node for subtracting a first current for the feedback signal from a second current for the input signal.

5. The apparatus of claim 1, further comprising a bandpass filter to filter a received signal and provide the input signal.

6. The apparatus of claim 1, where the input signal comprises a desired signal at a particular frequency, and the downconverter frequency downconverting the desired signal from the particular frequency to baseband.

7. The apparatus of claim 1, where the downconverter frequency downconverts the second signal based on a first local oscillator (LO) signal, and the upconverter frequency upconverts the third signal based on a second LO signal having same frequency as the first LO signal.

8. The apparatus of claim 1, where the filter blocks a desired signal being received and passes out-of-band signal components.

9. The apparatus of claim 1, where the filter comprises a differentiator.

10. The apparatus of claim 1, where the filter comprises multiple differentiators of different orders.

11. The apparatus of claim 1, where the filter comprises a highpass filter.

12. The apparatus of claim 1, further comprising a lowpass filter to filter the third signal and provide a filtered third signal, the lowpass filter removing components due to local oscillator (LO) signals for the downconverter and upconverter, and the upconverter frequency upconverting the filtered third signal.

13. The apparatus of claim 1, where the summer, the filter, and the upconverter form a tracking filter to filter a received signal for multiple frequency bands in Global System for Mobile Communications (GSM).

14. The apparatus of claim 1, where the summer, the filter, and the upconverter form a tracking filter to filter a received signal from a diversity antenna.

15. An integrated circuit comprising:
    a summer to receive an input signal and a feedback signal and provide a first signal;
    a downconverter to frequency downconvert a second signal derived based on the first signal and provide an output signal at the output of a receive path of the integrated circuit;
    a filter to filter the output signal and provide a third signal; and
    an upconverter to frequency upconvert the third signal and provide a fourth signal from which the feedback signal is derived, where the summer, the filter and the upconverter form a tracking filter.

16. The integrated circuit of claim 15, further comprising a low noise amplifier (LNA) to amplify the first signal and provide the second signal.

17. The integrated circuit of claim 15, where the filter comprises a differentiator.

18. A method of filtering an input signal having unwanted frequencies at a receive path, comprising:
    subtracting a feedback signal from the input signal to obtain a first signal;

downconverting a second signal based on the first signal to obtain an output signal at the output of the receive path;

filtering the output signal to obtain a third signal;

upconverting the third signal to obtain a fourth signal; and forming the feedback signal based on the fourth signal, where the feedback signal is used to remove the unwanted frequencies.

19. The method of claim 18, where the filtering the output signal comprises differentiating the output signal to obtain the third signal.

20. The method of claim 18, further comprising amplifying the first signal to obtain the second signal.

21. An apparatus for communication, comprising:

means for subtracting a feedback signal from an input signal to obtain a first signal;

means for downconverting a second signal derived based on the first signal to obtain an output signal at the output of a receive path of the apparatus;

means for filtering the output signal to obtain a third signal;

means for upconverting the third signal to obtain a fourth signal; and means for deriving the feedback signal based on the fourth signal, where the means for subtracting, the means for filtering, the means for upconverting and the means for deriving form a tracking filter.

22. The apparatus of claim 21, where the means for filtering the output signal comprises means for differentiating the output signal to obtain the third signal.

23. The apparatus of claim 21, further comprising means for amplifying the first signal to obtain the second signal.

* * * * *